No. 625,709. Patented May 23, 1899.
J. B. SPENCER.
BACK PEDALING BRAKE.
(Application filed Feb. 15, 1899.)
(No Model.) 3 Sheets—Sheet I.
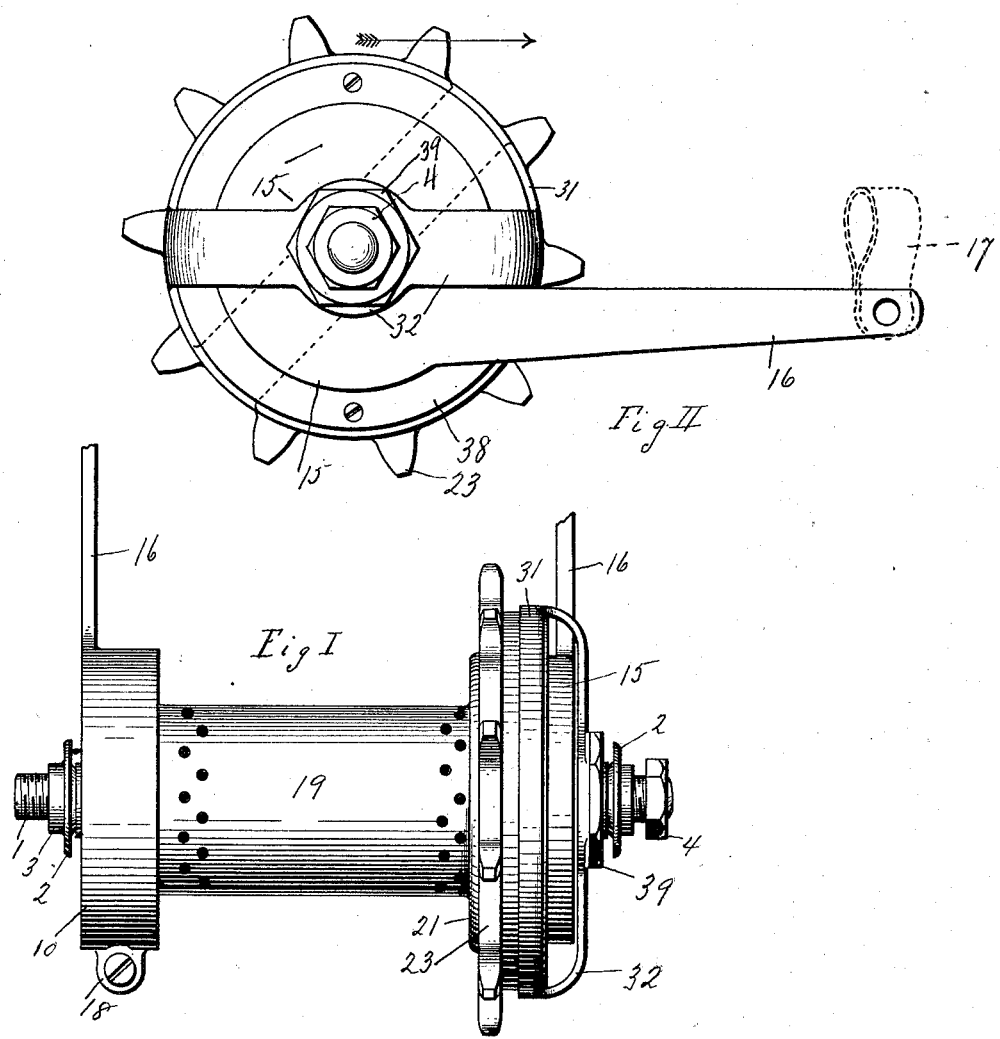
WITNESSES:
C. E. Tomlinson
Frank Carey
INVENTOR.
J. B. Spencer,
BY Alfred Wilkinson
ATTORNEY.

No. 625,709. Patented May 23, 1899.
J. B. SPENCER.
BACK PEDALING BRAKE.
(Application filed Feb. 15, 1899.)
(No Model.) 3 Sheets—Sheet 2.
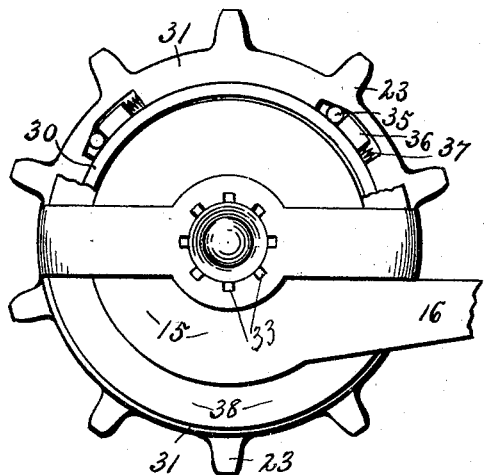
Fig. V.
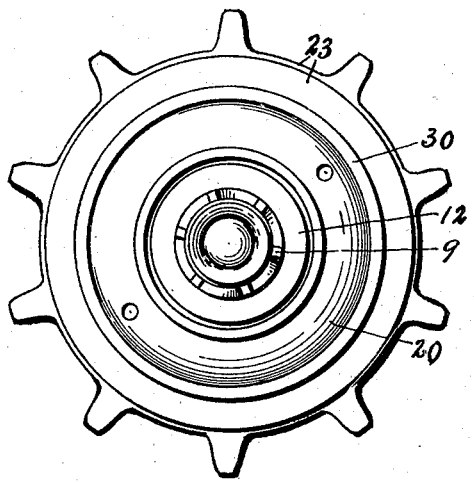
Fig. VI.
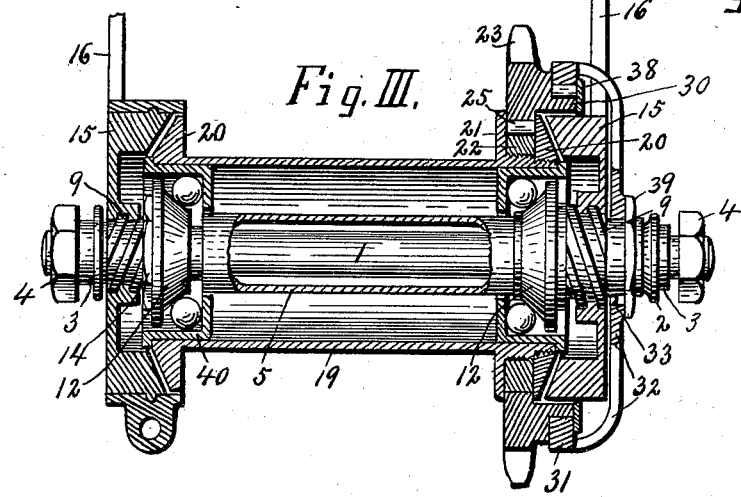
Fig. III.
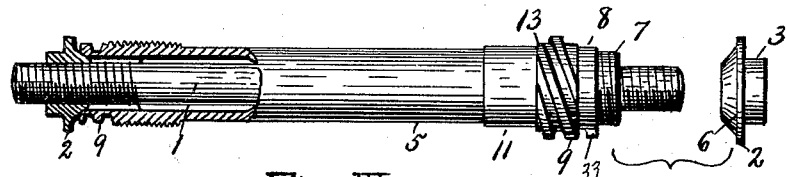
Fig. IV.
WITNESSES:
M. D. Lewis.
H. M. Seamans
INVENTOR
J B Spencer
BY
Alfred Wilkinson
ATTORNEY No. 625,709. Patented May 23, 1899.
J. B. SPENCER.
BACK PEDALING BRAKE.
(Application filed Feb. 15, 1899.)
(No Model.) 3 Sheets—Sheet 3.
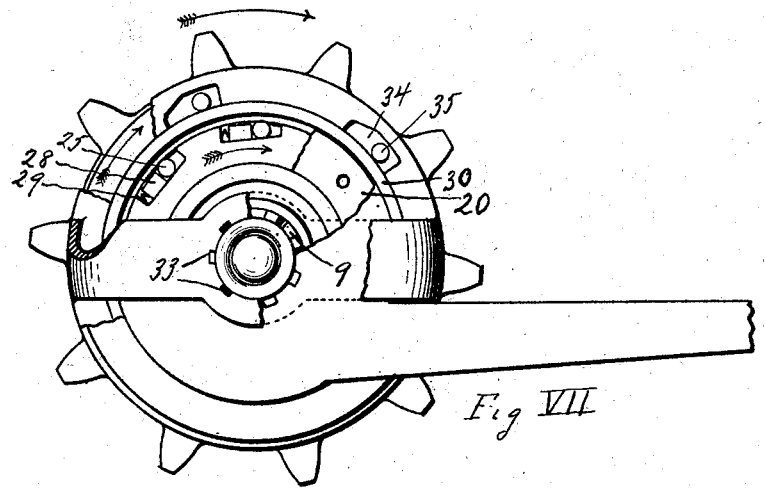
Fig VII
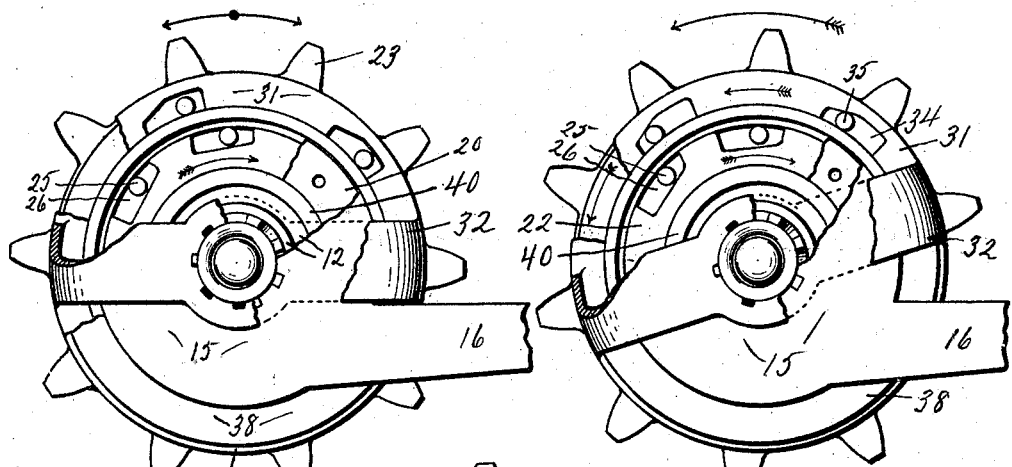
Fig VIII
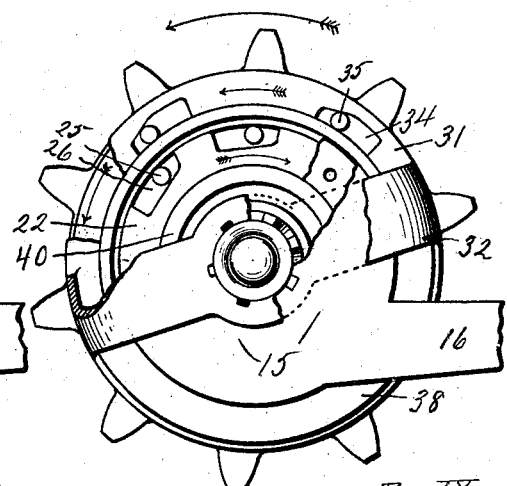
Fig IX
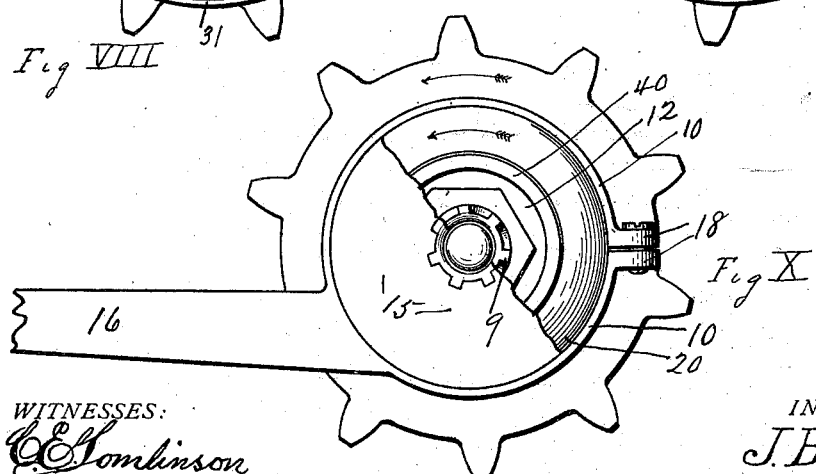
Fig X
WITNESSES:
C. E. Tomlinson
Frank Carey
INVENTOR.
J. B. Spencer
BY Alfred Wilkinson
ATTORNEY.

UNITED STATES PATENT OFFICE.

JAMES B. SPENCER, OF SYRACUSE, NEW YORK, ASSIGNOR TO E. C. STEARNS & CO., OF SAME PLACE.

BACK-PEDALING BRAKE.

SPECIFICATION forming part of Letters Patent No. 625,709, dated May 23, 1899.

Application filed February 15, 1899. Serial No. 705,589. (No model.)

*To all whom it may concern:*

Be it known that I, JAMES B. SPENCER, of Syracuse, in the county of Onondaga, in the State of New York, have invented new and useful Improvements in Bicycle-Brakes, of which the following, taken in connection with the accompanying drawings, is a full, clear, and exact description.

What I have invented is a new and improved back-pedaling brake which is simple and strong in construction, positive and effective in operation whether the parts are released to turn freely in coasting or the friction-surfaces of the clutch brought in contact for braking by back-pedaling, and has the decided improvement of operating on both sides of the hub, overcoming the disadvantage of the strain on the bearings and forks when force is applied on one side only.

My brake is particularly adapted to be applied to the rear hub.

The essential parts of my invention are the axle, having a smaller cone screwed on each end and secured in the fork sides by ordinary means. On the axle is arranged, between the tapering inner ends of the cones, a sleeve having near each end the main or friction-plate screws, the main cones of the wheel-bearing being secured on the axle by any usual means. To these main screws on both ends are fitted the friction-plates, having friction-surfaces on their inner faces secured against rotation by the integral arm clamped on each side to its fork side. At its right end the hub is formed with a shoulder against which is screwed an inner ring, around which fits the sprocket. Between the circumferences in contact of these parts are cut slots, larger toward the rear and gradually diminishing toward the front, to which are fitted small binding-rollers turning freely in the larger portions of the slots, but binding in the smaller portion and locking the sprocket on the ring. On the hub, outside of the ring and sprocket, is screwed the inner friction-ring, which at the left end may be secured in a similar manner or made integral with the hub. These rings have friction-surfaces on their outer faces. To an annular shoulder on the sprocket, extending outwardly beyond the friction-ring, is fitted a bridge-ring, whose integral supporting bridge or arms are secured to the sleeve. Between the adjacent circumferences of this shoulder and bridge-ring are formed the outer binding-slots, of reverse construction to the inner, with their larger portions in front gradually diminishing toward the rear, to which are fitted a second set of friction-rollers turning freely in the larger portion of the slots, but binding in the smaller and locking the ring to the sprocket.

My invention will be better understood by reference to the accompanying drawings, in which the same reference-numerals indicate the same parts in all the figures.

Figure I is a top plan view of my improved hub and brake. Fig. II is a side elevation thereof. Fig. III is a longitudinal section. Fig. IV shows the axle and ring removed from the other parts, a portion of this view being in section. Fig. V is a right end elevation with a portion of the dust-ring broken away and the end nuts and cone removed to show the means by which the bridge may be secured to the shaft. Fig. VI is a view, corresponding to the preceding, showing the bridge and bridge-ring also removed. Fig. VII is a corresponding elevation with portions broken away, showing the binding-rollers in position for ordinary riding. Fig. VIII shows them in coasting position; Fig. IX, in back-pedaling position when the brake is applied. Fig. X is a left end elevation, portions being broken away.

In the figures, 1 indicates the axle-screw-threaded at its ends for receiving the smaller cones 2 2, having outer shoulders 3 3 fitted to the slots or openings in the fork sides and for the nuts 4 4 for clamping the wheel in place. On the axle is arranged the sleeve 5, having its ends fitted to the tapering inner ends 6 6 of the small cones so as to be more or less free to turn thereon. At the right end the sleeve is formed with the screw-threaded tip 7 for lock-nut, annular surface or bridge-space 8 for the bridge, and friction-screw 9, the corresponding screw at the opposite end being of reverse formation and of smaller diameter, as there shown. 11 is a cone-space, to which is fitted cone 12, bearing against shoulder 13 on inner end of the screw, corresponding cone at the opposite end being screwed on the sleeve and retained by means of a lock-nut 14. It is evident that the left screw is made smaller than the right merely to permit the cones to be slipped over it. If desired, it may be of the same size on a separate plug, to be secured to the sleeve after the cones have been set in position. To these screws are fitted at each end the friction-plates 15 15, having friction-surfaces on their inner faces, secured against rotation by integral arms 16 16, clamped to their respective fork sides by clamps 17. These plates and their arms may be made separate and secured together by means of straps 10 10 on the arm surrounding the plate and clamped thereto by means of ears 18 18 and screws or other desirable means.

20 20 indicate the inner friction-rings secured on the hub 19, integral therewith, if desired, as shown on the left, and having frictional surfaces on their outer faces fitted to the friction-surfaces of the friction-plates 15. Between the right friction-ring and flange 21 on the hub is secured, by right-hand thread, inner ring 22, to whose outer circumference is fitted the sprocket 23, the friction-ring secured by left thread acting also as a lock-nut and holding the inner friction-rollers 25 in slots 26, which are larger toward the rear, diminishing gradually toward the front, these rollers being constantly forced forward by means of blocks 28 28 and springs 29 29. The rollers are of such a size as to turn freely in the larger portion of the slots, but to bind in the smaller, locking the sprocket to the ring and hub. These slots, as here shown, are formed entirely in the outer margin of the ring.

The sprocket is formed with an outwardly-extending annular shoulder 30, to which is snugly fitted bridge-ring 31 on bridge 32, secured to the sleeve on surface 8 by studs 33 or other desirable means. Between the inner circumference of the bridge and the outer circumference of the shoulder are formed the outer friction-slots 34 34, of reverse construction to the inner, being larger in front and diminishing gradually toward the rear, in which are held the outer friction-rollers 35 35, constantly forced back by blocks 36 36 and springs 37 37. These rollers turn freely in larger portion of slots, but bind in smaller, locking bridge-ring to sprocket. These slots, as here shown, are formed entirely in edge of bridge-ring, but may be formed in whole or in part in sprocket-shoulder.

38 is a plate or dust-ring screwed to the outer face of the sprocket by screws or other desirable means to cover the sprockets and hold the rollers in position.

39 is a lock-nut for the bridge-ring.

40 40 are the cups.

From this description the operation of my brake will be clear. When being ridden, as usual, ahead, the action of the small springs, together with friction of the parts, forces forward the inner friction-rollers, locking the sprocket to the ring and hub. When it is desired to coast and the feet are held motionless on the pedals, the parts assume the position shown in Fig. VIII, where both sets of rollers are forced out of locking position against the force of the springs by the friction of the rotating parts. In this position the hub is not locked to the sprocket, but is motionless on the pedals. When it is desired to brake the wheel by back-pedaling, the inner friction-rollers still remain free, but the sprocket being turned backward the outer friction-rollers are forced back in the slots both by springs and by friction, locking the sprocket to the bridge-ring, whereby the sleeve is rotated a short distance toward the rear, and by the engagement of the screws with the friction-plates the latter are forced inwardly, engaging with the friction-rings on both sides simultaneously and braking the wheel. When the back-pedaling stops, this engagement at once ceases and the parts assume their coasting or riding position, accordingly as the feet are motionless or pedaling forward—that is, on the cessation of the back-pedaling the sprocket is no longer forced to the rear, by which it is locked to the bridge-ring through the medium of the outer rollers, and the bridge-ring, bridge, and sleeve are free to turn forward to their original position. The pressure being thus removed which holds the friction-surfaces in contact, the wheel and hub are again rotated, so that the slight friction of the bearings tends to rotate the sleeve forward, separating the friction-surfaces, and at the same time the friction between those surfaces tends to force the friction-plates outwardly, thus coöperating with the said friction of the bearings, it being noticed that the pitch of the friction-screws is sufficiently steep to prevent binding.

Having described my invention, what I claim as new, and desire to secure by Letters Patent, is—

1. In combination in a back-pedaling bicycle-brake, the rear axle sustained in the fork sides, a sleeve sustained on the axle having reverse screws at each end, friction-plates fitted to said screws and attached to arms secured to the fork sides, so that said friction-plates are capable of inward movement to engage with the friction-rings, the hub fitted to said sleeve, cones, cups and balls arranged between the hub and sleeve, friction-rings secured to the hub ends, and means for turning said sleeve to force inwardly said friction-plates to engage with said friction-rings on both sides, simultaneously.

2. In combination, in a back-pedaling bicycle-brake, the rear axle sustained in the fork sides, a sleeve supported on the axle having reverse screws at each end, friction-plates fitted to said screws and secured to the fork sides by integral arms, so that the inward movement of said friction-plates to engage with the friction-rings is permitted, cones on said sleeve, the hub with internal cups having friction-rings secured to its ends, the sprocket fitted on said hub, means by which the sprocket may be locked to the hub or released therefrom by holding the feet stationary, supporting arms or bridge secured to the sleeve carrying a ring fitted to an annular outwardly-extending shoulder on said sprocket, means for locking said ring to said shoulder during back-pedaling for turning said sleeve rearwardly and forcing the friction-plates on each side into contact with the friction-rings.

3. In combination, in a back-pedaling brake, the rear forks of a bicycle, the rear axle having small cones threaded to each end, means for securing the axle in the fork sides, a sleeve fitted to said axle and secured rotatively between said cones, reverse screws near the ends of the sleeve, the main cones of the wheel-bearings arranged within said screws, the wheel-hub with cups fitted to the axle and cones, friction-rings at each end of the hub and at one end an inner ring arranged between the friction-ring and an integral flange, a sprocket fitted to the outer circumference of said inner ring, slots of varying size formed between the adjacent surfaces of said sprocket and inner ring, rollers arranged in said slots to lock the parts together during forward pedaling, an integral annular shoulder on the sprocket, friction-plates fitted to said reverse threads and secured to the fork sides by arms permitting their inward movement to engage with said friction-rings, a bridge-ring secured to the sleeve and fitted to the outer circumference of said shoulder, slots of varying size formed between the adjacent surfaces of said shoulder and said bridge-ring, rollers fitted to said slots arranged to lock the parts together during back-pedaling to turn the bridge-ring and sleeve rearwardly and force the friction-plates by the engagement of the screws inwardly to engage with the friction-rings.

4. In combination, in a back-pedaling bicycle-brake, the rear-fork sides, an axle secured thereto by nuts, small cones fitted to the ends of the axle having tapering inner ends, a sleeve fitted to said axle and secured rotatively between the cones, a bridge-space, friction-screw and cone-space formed on the right end of the sleeve and a corresponding, reverse, smaller friction-screw on its left end, said right-end friction-screw having a shoulder on each side, main cones arranged on said sleeve within said friction-screws, the hub supported on said sleeve by means of cups and balls having an integral friction-ring on its left end and a corresponding friction-ring secured on its right end by a left-hand thread, an integral flange adjacent to right friction-ring, an inner ring secured between said flange and friction-ring on the hub by a right screw-thread, both of said friction-rings having friction-surfaces on their outer faces, the sprocket fitted to the outer circumference of said inner ring, and formed between the adjacent edges of said inner ring and sprocket, slots of larger size toward the rear and diminishing toward the front, rollers fitted to turn freely in the larger portion of said slots, but binding in the smaller to lock the sprocket to the ring, blocks and springs arranged in said slots to force said rollers forwardly, an outwardly-extending annular shoulder on the sprocket, friction-plates fitted to said reverse threads and secured to the fork sides by arms permitting their inward movement to engage with said friction-rings, a bridge-ring fitted thereto and secured non-rotatively on the bridge-space of the sleeve by the bridge or bridge-arms, and formed between the adjacent edges of said shoulder and bridge-ring, slots larger in size toward the front and gradually diminishing toward the rear, rollers fitted to turn freely in the larger portion of said slots, but binding in the smaller to lock the sprocket to the bridge-ring and so to the sleeve, blocks and springs arranged in said slots to force said rollers rearwardly, and a dust-ring secured to the outer face of said sprocket to cover said outer binding-slots.

In testimony whereof I have hereunto signed my name.

JAMES B. SPENCER. [L. S.]

Witnesses:
H. M. SEAMANS,
ALFRED WILKINSON.